United States Patent
Horst et al.

(10) Patent No.: US 6,693,584 B2
(45) Date of Patent: Feb. 17, 2004

(54) METHOD AND SYSTEMS FOR TESTING AN ANTENNA

(75) Inventors: Folkert Horst, Pierrefonds (CA); Magid Mokhtar, Kirkland (CA)

(73) Assignee: Canac Inc., St-Laurent (CA)

( * ) Notice: Subject to any disclaimer, the term of this patent is extended or adjusted under 35 U.S.C. 154(b) by 0 days.

(21) Appl. No.: 10/059,654

(22) Filed: Jan. 29, 2002

(65) Prior Publication Data

US 2003/0142003 A1 Jul. 31, 2003

(30) Foreign Application Priority Data

Jan. 28, 2002 (CA) ............................................. 2369653

(51) Int. Cl.$^7$ ................................................ G01S 7/40
(52) U.S. Cl. ...................................... 342/165; 342/173
(58) Field of Search .............................. 342/42, 44, 50, 342/51, 70, 71, 72, 165, 169, 170, 173, 174; 246/5, 6

(56) References Cited

U.S. PATENT DOCUMENTS

| | | | |
|---|---|---|---|
| 3,399,405 A | 8/1968 | Daniel, Jr. .................... | 342/44 |
| 3,406,391 A | 10/1968 | Le Von, Jr. .................... | 342/44 |
| 3,940,765 A | 2/1976 | Grafinger et al. .............. | 342/51 |
| 4,138,678 A * | 2/1979 | Kirner ......................... | 342/173 |
| 4,292,636 A | 9/1981 | Egger et al. ................... | 342/51 |
| 4,799,059 A * | 1/1989 | Grindahl et al. ........ | 340/870.03 |
| 5,134,418 A | 7/1992 | Gomez et al. .............. | 343/718 |
| 5,262,787 A * | 11/1993 | Wilson et al. .............. | 342/173 |
| 5,437,422 A * | 8/1995 | Newman ........................ | 246/4 |
| 5,689,266 A * | 11/1997 | Stelling et al. ............. | 342/165 |
| 6,144,692 A | 11/2000 | Beck .......................... | 375/130 |
| 6,234,428 B1 * | 5/2001 | Bachtiger et al. .............. | 246/7 |
| 6,334,428 B1 | 1/2002 | Nagatani et al. | |
| 6,335,705 B1 * | 1/2002 | Grace et al. ................ | 343/703 |

* cited by examiner

Primary Examiner—John B. Sotomayor
(74) Attorney, Agent, or Firm—Merchant & Gould, P.C.

(57) ABSTRACT

A system for testing a vehicle antenna is provided including a testing transponder and a monitoring unit. The testing transponder is positioned such that it lies within the electromagnetic field of a vehicle antenna and, while in the electromagnetic field, the testing transponder intermittently transmits signals conveying data to the vehicle antenna. The monitoring unit is in an operative relationship with the antenna and is suitable to receive data indicative of the signals conveying data detected by the vehicle antenna. The monitoring unit detects an error condition associated with the vehicle antenna when the time since the last signal conveying data detected by the antenna exceeds a certain threshold time period.

20 Claims, 4 Drawing Sheets

METHOD AND SYSTEMS FOR TESTING AN ANTENNA

FIELD OF THE INVENTION

This invention relates generally to the use of transponders for position determining systems that make use of vehicle-mounted antennas and transponder devices. More particularly, this invention relates to a method and system for testing the integrity of a vehicle-mounted antenna in a position determining system.

BACKGROUND OF THE INVENTION

Typically in order to identify the location of a vehicle, transponders are installed on the vehicle path at various locations. Coded information is stored in the transponders by means of tuned resonators. The coded information may include fixed data about distances from fixed reference points and may also include variable data relating, for example, to travel orders. Antennas which utilize a given frequency band and which emit an electromagnetic wave in that frequency band are positioned on the vehicle. When a vehicle transporting an antenna passes in the vicinity of a transponder and the antenna emits electromagnetic waves in a frequency band to which the transponder is tuned, the antenna's electromagnetic waves power the transponder. This causes the resonator circuit in the transponder to resonate and results in the transmission of the data stored therein. This information is received by the antenna and transmitted to signal processing equipment coupled to the antenna for processing.

In the absence of transponders on the vehicle's path, the antenna does not receive any transponder data transmissions. Therefore, a system making use of the antenna to receive transponder data would not find unusual the absence of transponder transmissions. When a defective antenna, which was previously located in non-transponder territory, enters transponder territory, the defective antenna fails to receive any transponder transmission. The failure to receive a transponder transmission may be problematic in particular if the position determining system makes use of these transmissions to coordinate vehicle traffic.

A deficiency of systems of the type described above is that they provide no practical way of determining whether the absence of transponder transmission is due to the absence of transponders or to a defective vehicle antenna.

Consequently there exists a need in the industry to provide an improved method, device and system for testing an antenna on a vehicle that alleviates at least in part the deficiencies of prior art methods and devices.

SUMMARY

In accordance with a broad aspect, the invention provides a method for testing a vehicle antenna. A testing transponder responsive to an electromagnetic field of a vehicle antenna is provided. While positioned in the electromagnetic field of the vehicle antenna, the testing transponder is adapted to intermittently transmit signals conveying data in a format suitable to be detected by the vehicle antenna. The signals detected by the antenna are monitored to detect an error condition associated with the vehicle antenna. In a non-limiting example of implementation, an error condition associated with a vehicle antenna is detected when a time period since the last signal detected by the antenna exceeds a certain threshold time period.

Advantageously, in the absence of transponders on the vehicle path, the antenna continues to receive data transmissions from the testing transponder. Therefore, the absence of transponder transmissions, for a period of time exceeding a threshold, indicates a failure in the antenna. The receipt of transponder transmissions by the antenna confirms that the antenna is functioning namely that it is able to receive transponder transmissions.

Advantageously, providing a testing transponder adapted to emit intermittently rather than continuously reduces transmission conflicts between the testing transponder and a transponder on the vehicle path that is being powered by the antenna. The time between testing transponder transmissions is a trade-off between providing a long time delay to reduce the processing time required to monitor the transponder transmission and providing a time delay that is sufficiently short to provide the proper level of confidence that the antenna is functioning.

In a non-limiting implementation, the testing transponder is adapted to transmit a signal periodically such that the duration of the time periods between the transmissions is the same. Alternatively, the testing transponder may be adapted to transmit a signal non-periodically such that the duration of the time periods between the transmissions is different from one time period to the next.

In accordance with a broad aspect, the invention provides an apparatus for testing a vehicle antenna. The apparatus being responsive to an electromagnetic field of a vehicle antenna for intermittently transmitting signals conveying data in a format suitable to be detected by the vehicle antenna.

In accordance with another broad aspect, the invention provides a system including in combination a testing transponder and a monitoring unit. The testing transponder is responsive to the electromagnetic field of an antenna to intermittently transmit signals conveying data in a format suitable to be detected by the vehicle antenna. A monitoring unit monitors the signals detected by the antenna and detects an error condition associated with the vehicle antenna when the time since the last signal detected by the antenna exceeds a certain threshold time period.

In accordance with a specific implementation, the apparatus for testing a vehicle antenna includes a receiver, a processing unit and a transmitter. The receiver is responsive to the electromagnetic field of a vehicle antenna for generating a first power signal. The processing unit processes the first power signal to generate an intermittent power signal, where the intermittent power signal includes power segments. The transmitter is responsive to the power segments in the intermittent power signal to generate a succession of signals, each signal conveying data to be transmitted to the vehicle antenna.

In accordance with another broad aspect, the invention provides an apparatus for testing a vehicle antenna. The apparatus includes means responsive to an electromagnetic field of a vehicle antenna for generating a first power signal. The apparatus also includes means for processing the first power signal to generate an intermittent power signal, the intermittent power signal including power segments. The apparatus also includes means responsive to the power segments in said intermittent power signal for generating a succession of signals, each signal conveying data to be transmitted to the vehicle antenna.

Other aspects and features of the present invention will become apparent to those ordinarily skilled in the art upon review of the following description of specific embodiments of the invention in conjunction with the accompanying figures.

Figure 1:
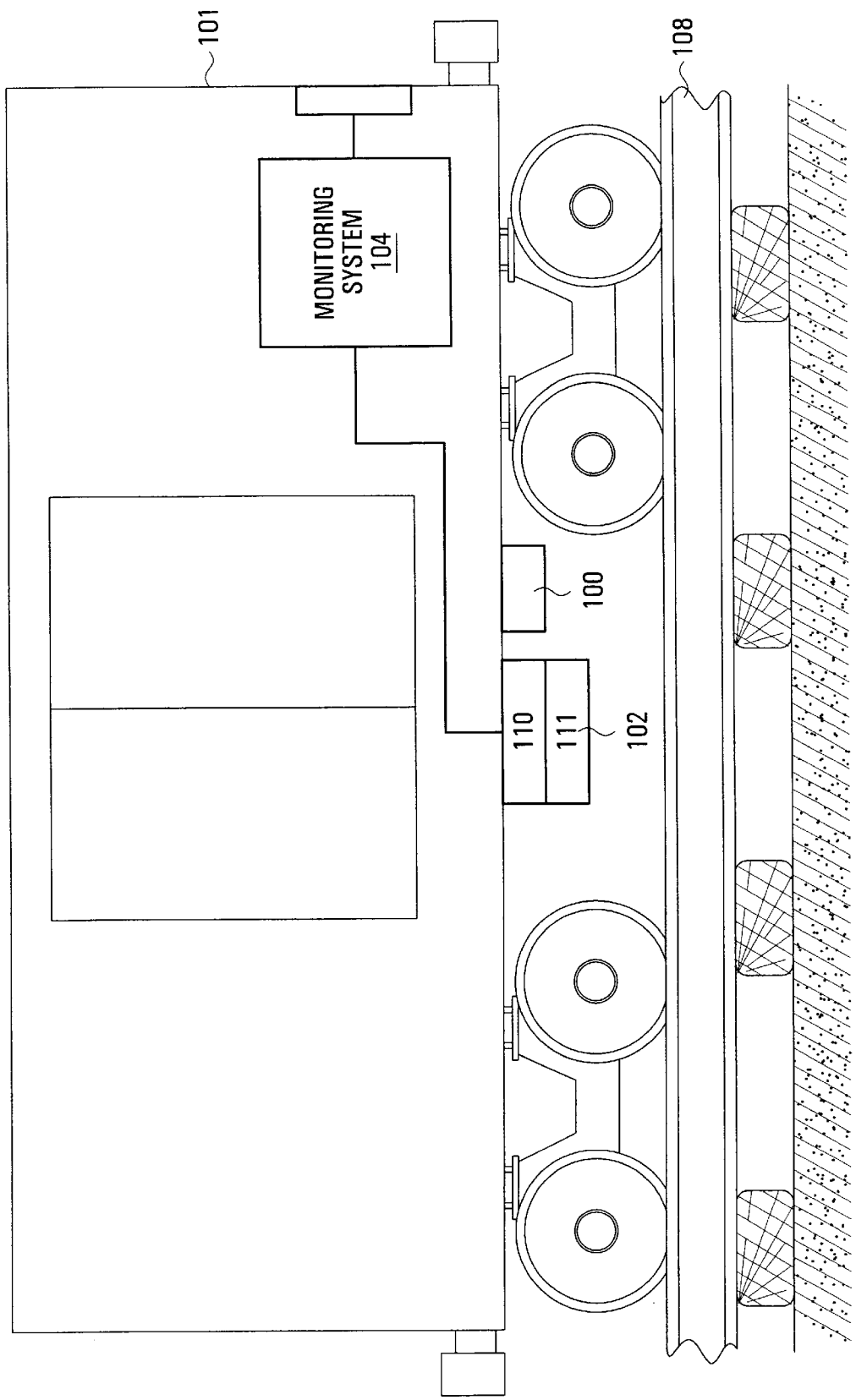
FIG. 1 is a diagrammatic showing of an arrangement of a vehicle antenna and apparatus for testing a vehicle antenna and associated monitoring system in accordance with an example of implementation of the invention.

In the drawings, embodiments of the invention are illustrated by way of example. It is to be expressly understood that the description and drawings are only for purposes of illustration and as an aid to understanding, and are not intended to be a definition of the limits of the invention.

DETAILED DESCRIPTION

The specific example of implementation describes a method and system for testing a train-mounted antenna. It will be readily apparent to the person skilled in the art that the method and system described can be used to test antennas mounted on vehicles other than trains without detracting from the spirit of the invention.

Referring to FIG. 1, a railcar 101 is positioned on railroad tracks 108. The railcar 101 carries an antenna 102, a monitoring system 104 and a testing transponder 100.

The antenna 102 includes a radiating member 111 and a receiving member 110. The radiating member 111 of the antenna 102, when in operation, generates an electromagnetic field characterized by electromagnetic waves in a first frequency band. The receiving member 110 of the antenna 102 is adapted to detect signals conveying data transmitted in a second frequency band. The antenna 102 is coupled to monitoring system 104 in order to transmit information in the signals detected thereto. The coupling between the antenna 102 and the monitoring system 104 allowing the antenna and the monitoring system 104 to exchange information may be effected through any suitable communication medium including but not limited to copper wiring, fiber optics, coaxial cable, Ethernet cable and wireless link (IR link) amongst others.

The monitoring system 104 is operative to monitor the signals conveying data received from the antenna 102. The monitoring system 104 expects the antenna to receive a transponder transmission during a given time period. The monitoring system 104 keeps track of the time period since the reception of the last signal conveying data detected. If the time period since the last signals received exceeds a certain threshold time period, then an error condition associated with the antenna is assumed by the monitoring system. In a non-limiting specific example of implementation, this is effected by a time-stamp being assigned for each signal conveying date received by the monitoring system and a clock keeping track of the current time. If the time period between the last time-stamp and the current time exceeds a threshold time period, an error condition is assumed to be present with the antenna 102. In another non-limiting specific example of implementation, this may be effected by a counter that is incremented for each time segment that goes by for which no transponder signal is detected by the antenna. The counter is reset for each signal conveying received by the antenna 102. When the counter exceeds a threshold time period, an error condition is assumed to be present with the antenna 102. When an error condition is detected, the monitoring unit 104 issues the appropriate signals to initiate an established safety procedure such as, for example, stop the train. Many other implementations are possible without detracting from the spirit of the invention.

The testing transponder 100 is responsive to the electromagnetic field of antenna 102 for intermittently transmitting signals conveying data in a format suitable to be detected by the receiving member 110 of the antenna 102. The testing transponder 100 is positioned on the railcar 101 within the operative range of the antenna 102. In other words, the testing transponder 100 is positioned in sufficiently close proximity to the antenna 102 such that it lies within the electromagnetic field generated by the radiating member 111 of the antenna 102. Also, the testing transponder 100 is positioned in sufficiently close proximity to the antenna 102 such that the receiving member 110 of the antenna 102 can detect a signal conveying data transmitted by the testing transponder 100. In FIG. 1, the antenna 102 and testing transponder 100 are positioned on the bottom panel of the railcar 101 such as to allow a greater proximity between the antenna 102 and the transponders positioned in the railroad tracks 108. It is to be understood however, this is only one of many suitable positions of the antenna 102 and testing transponder 100 on railcar 101. In addition, it is to be understood that although the description refers to the transponder 100 being positioned on the same railcar as the antenna 102, transponder 100 may be positioned on another railcar provided it remains within the electromagnetic field of antenna 102.

By placing a testing transponder 100 aboard railcar 101 in the operative range of the antenna 102, the testing transponder is continuously powered by the antenna 102 and intermittently transmits signals conveying data. The testing transponder 100 in combination with the monitoring system 104 can be used to test the antenna 102 and detect error conditions associated therewith. As the monitoring unit 104 expects to receive a transponder transmission with a given threshold time period, the absence of transponder transmissions during a time period exceeding the given threshold time period indicates a failure of the antenna. Similarly, the receipt of these signals within the time period confirms that the antenna is able to receive signal transmissions.

In a non-limiting implementation, the testing transponder 100 is positioned relative to the antenna 102 such that the strength of the electromagnetic field of antenna 102 at the testing transponder is less than the strength of the electromagnetic field of antenna 102 at transponders on the railway track. In this configuration, the test transponder is intentionally positioned in a non-optimal location relative to the antenna. Advantageously, by positioning the testing transponder in an non-optimal location relative the antenna, it can generally be assumed that if the signals transmitted by the testing transponder 100 can be detected by the antenna, then the signals transmitted by transponders on the railway track can also be detected by the antenna.

The Testing Transponder 100

Figure 2:
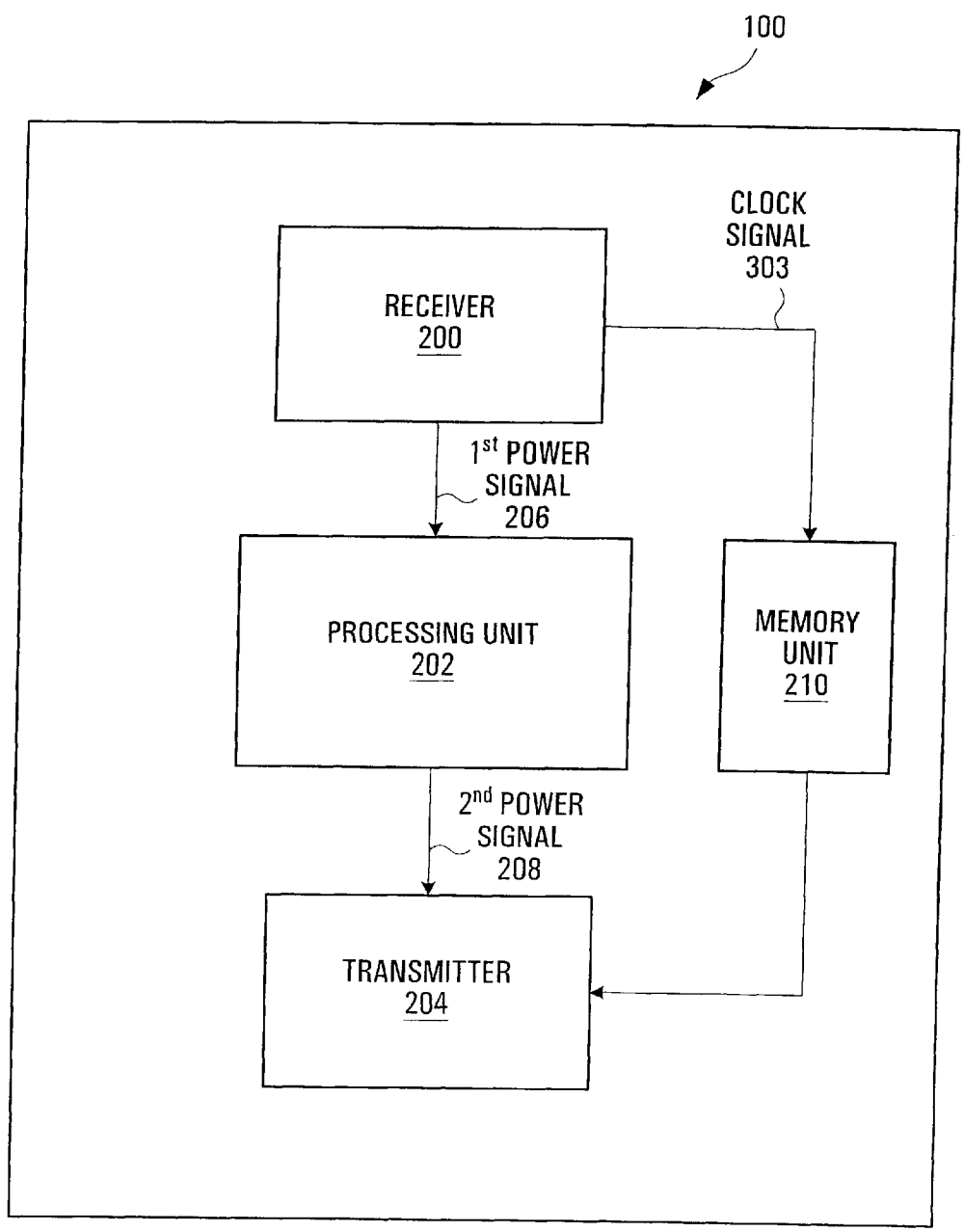
FIG. 2 is a high level block diagram of the apparatus for testing a vehicle antenna depicted in FIG. 1 in accordance with an example of implementation of the invention.

Testing transponder 100 is depicted in greater detail in FIG. 2. As shown, the testing transponder includes a receiver 200, a processing unit 202, a transmitter 204 and a memory unit 210.

Figure 4A:
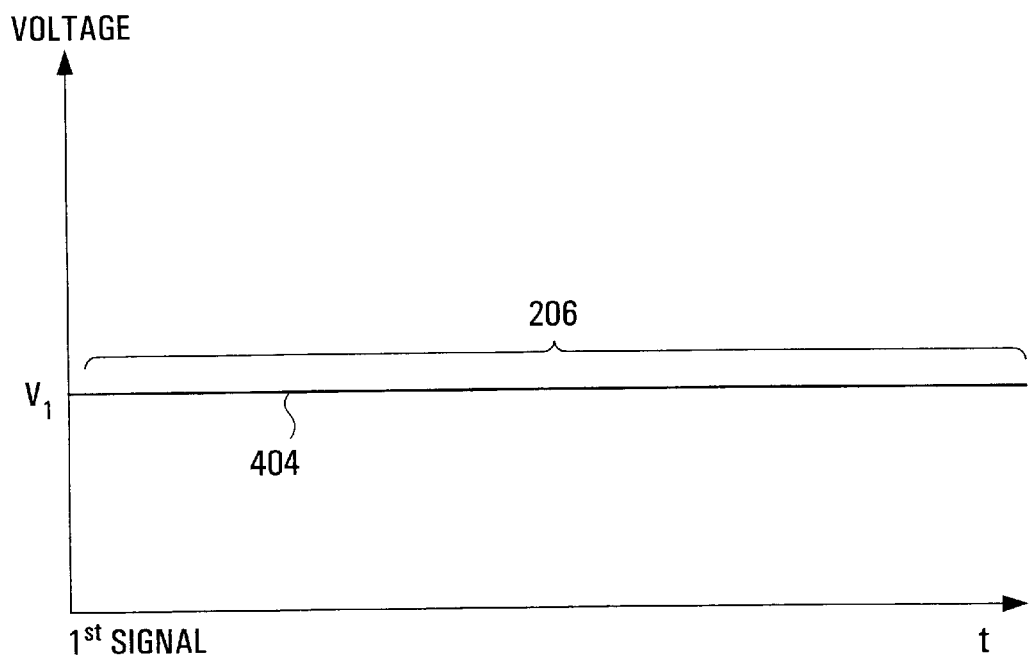
FIG. 4 depicts charts showing the power signals generated by the apparatus for testing a vehicle antenna of FIG. 2 in accordance with a non-limiting example of implementation.

The receiver 200 is responsive to the electromagnetic field of the radiating member 111 of the antenna 102 (shown in FIG. 1) for generating a first power signal 206. In a non-limiting example, the first power signal 206 is a constant voltage signal. FIG. 4a depicts in graphical format the first power signal 206 having a constant voltage $V_1$ over time, shown by line 404. In this specific example, the receiver 200 also generates a clock signal 303 for transmission to memory unit 210.

Figure 4B:
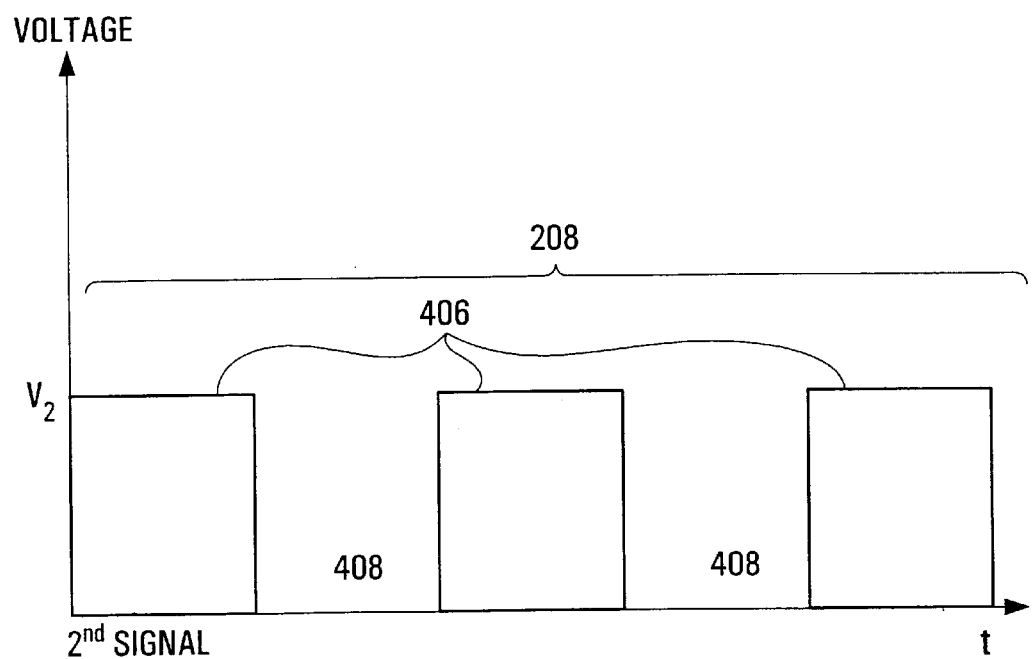

The processing unit 202 processes the first power signal 206 to generate an intermittent power signal 208 where the intermittent power signal includes power segments. In a specific example, the second power signal 208 includes a set of power segments separated by non-power segments. FIG. 4b depicts in graphical format a specific example of the second power signal 208 having a set of power segments 406 of voltage $V_2$ separated by non-power segments 408. It is to be understood that the expression "non-power segment" indicates a segment where the power is less than that in the power segments. Generally, the non-power segments 408 are considered to be at a 0V level. The duration of the non-power segments 408 is shorter than the threshold time period used by the monitoring unit 104 (shown in FIG. 1) to detect a failure in antenna 102 (shown in FIG. 1). In the example depicted in FIG. 4b, the intermittent power signal 208 includes regular time intervals during which power is transmitted. It will be readily appreciated that although the power segments 406 are depicted in FIG. 4b as having essentially the same duration, power segments of varying duration and a signal having irregular power intervals may also be used. It will also be readily appreciated that although the non-power segments 408 are depicted in FIG. 4b as having essentially the same duration, non-power segments 408 of varying duration may also be used.

Memory unit 210 is coupled to the transmitter 204 and stores coded information to be transmitted to an antenna. The coded information may include any suitable data element. In a non-limiting implementation, memory unit 210 stores a transponder identifier data element associated to the testing transponder 100. Memory unit 210 processes the clock signal 303 to extract the coded information and generate a data signal to be transmitted to an antenna and forwards that signal to transmitter 204.

The transmitter 204 is responsive to the power segments 406 (shown in FIG. 4b) in the intermittent power signal 208 to process the data signal received from said memory unit to generate a succession of signals, each signal conveying data to be transmitted to the antenna. In other words, during the power segments of the intermittent power signal 208, the transmitter 204 generates signals of sufficient power to be suitable for detection by the antenna 102 (shown in FIG. 1). During non-power segments 408, the transmitter 204 does not generate signals of sufficient power to be suitable for detection by the antenna 102.

Figure 3:
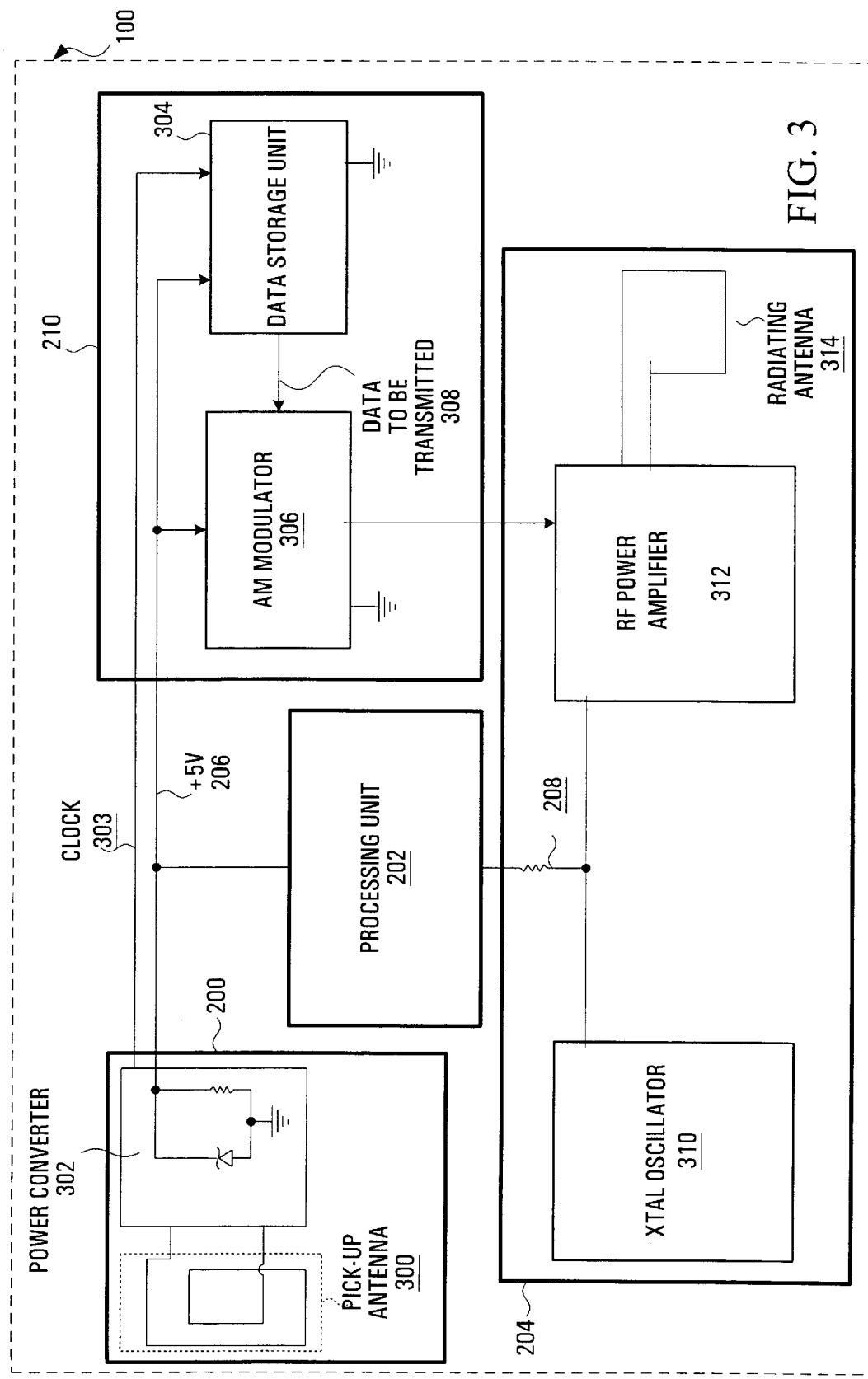
FIG. 3 is a detailed block diagram of the apparatus for testing a vehicle antenna depicted in FIG. 2.

FIG. 3 depicts a specific non-limiting implementation of the testing transponder 100. Many other implementations are possible without detracting from the spirit of the invention.

As shown, the receiver 200 includes a resonating circuit 300 and a power converter unit 302. The resonating circuit 300 is tuned to the frequency of the resonating member of antenna 102 (shown in FIG. 1). When in the electromagnetic field of antenna 102, the resonating circuit 300 generates a resonating signal, which resonates at a certain resonating frequency. The resonating signal is used as a clock signal 303 and transmitted to memory unit 210. The power converter unit 302 converts the resonating signal into a constant voltage signal 206. This constant voltage signal is released by the receiver as the first power signal 206. Any suitable method for converting an oscillating signal into a constant voltage signal may be used without detracting from the spirit of the invention.

The memory unit 210 includes a data storage unit 304 and an AM modulator 306. The data storage unit 304 receives the clock signal 303 and the first power signal 206 and releases a stream of data elements 308 to be transmitted to antenna 102 (shown in FIG. 1). The AM modulator 306 processes the stream of data elements 308 to generate a modulated data signal which in turn is forwarded to transmitter 204.

The processing unit 202 processes the first power signal 206 to generate an intermittent power signal 208 where the intermittent power signal includes power segments. The processing unit 202 is powered at least in part on the basis of the first power signal 206. In a non-limiting example of implementation, the processing unit 202 is powered entirely by the first power signal 206. Advantageously, by powering the processing unit 202 entirely based on a power signal derived from the resonating circuit 300, no external power supply is needed by the testing transponder 100 to make the processing unit 202 operate. In a non-limiting use of the testing transponder, the latter is mounted underneath the locomotive fully exposed to the elements, such as blowing snow, flying rocks, water, etc. When no external power supply is needed, no access hole into the housing carrying the transponder 100 is required. Such an access hole would reduce the environmental resistance of the transponder and would require additional wiring to install the transponder.

Any suitable implementation for processing unit 202 may be used including but not limited to a programmable logic array (PAL) or a general-purpose microprocessor.

The transmitter 204 includes a crystal oscillator 310, a radio frequency (RF) power amplifier 312 and a radiating antenna 314. The crystal oscillator 310 generates a signal at a frequency within the frequency band of the receiving member 110 of antenna 102 (shown in FIG. 1). The radio frequency (RF) power amplifier 312 receives the data signal from the memory unit 210 amplifies it using the power segments of the second power signal 208 and releases, via the radiating antenna 314, an amplified data signal modulated at a frequency suitable to be detected by the receiving member 110 of antenna 102 (shown in FIG. 1). The radiating antenna 314 emits signals such that signals conveying data emitted by the radiating antenna 314 can be detected by the antenna 102 (shown in FIG. 1) and transmitted to the monitoring unit 104 (FIG. 1). The transmitter 204 is powered at least in part on the basis of the intermittent power signal 208. In a non-limiting example of implementation, the transmitter 204 is powered entirely by the intermittent power signal 208. Advantageously, by powering the transmitter 204 and the processing unit 202 entirely based on power signals derived from the resonating circuit 300, no external power supply is needed by the testing transponder 100.

Although the present invention has been described in considerable detail with reference to certain preferred embodiments thereof, variations and refinements are possible without departing from the spirit of the invention. Therefore, only the appended claims and their equivalents should limit the scope of the invention.

What is claimed is:

1. An apparatus for testing a vehicle antenna, said apparatus being operative for:
   generating signals conveying data in a format suitable to be detected by a vehicle antenna;
   intermittently transmitting said signals in response to the presence of an electromagnetic field of a vehicle antenna.

2. An apparatus for testing a vehicle antenna, said apparatus comprising:
   a) a receiver responsive to an electromagnetic field of a vehicle antenna for generating a first power signal;

b) a processing unit coupled to said receiver, said processing unit being operative for processing said first power signal to generate an intermittent power signal, said intermittent power signal including power segments;

c) a transmitter responsive to the power segments in said intermittent power signal for generating a succession of signals, each signal conveying data to be transmitted to the vehicle antenna.

3. An apparatus as defined in claim 2, wherein said first power signal is a constant voltage signal.

4. An apparatus as defined in claim 2, wherein said receiver includes a resonating circuit responsive to an electromagnetic field generated by a vehicle antenna.

5. An apparatus as defined in claim 2, wherein said transmitter includes a radiating antenna.

6. An apparatus as defined in claim 2, wherein said intermittent power signal includes regular time intervals during which power is transmitted.

7. An apparatus as defined in claim 2, wherein said intermittent power signal includes irregular time intervals during which power is transmitted.

8. An apparatus as defined in claim 2, wherein said processing unit is powered at least in part on the basis of said first power signal.

9. An apparatus as defined in claim 8, wherein said processing unit is powered by said first power signal.

10. An apparatus as defined in claim 2, wherein said transmitter is powered at least in part on the basis of said intermittent power signal.

11. An apparatus as defined in claim 10, wherein said transmitter is powered by said intermittent power signal.

12. An apparatus as defined in claim 2, said apparatus further comprising a memory unit coupled to said transmitter, said memory unit being suitable for storing data elements to be transmitted to a vehicle antenna.

13. A method for testing a vehicle antenna, the vehicle antenna generating an electromagnetic field, said method comprising:

a) providing a testing transponder responsive to the elctromagnetic field of a vehicle antenna for intermittently transmitting signals conveying data in a format suitable to be detected by the vehicle antenna;

b) positioning the testing transponder in the electromagnetic field of a vehicle antenna;

c) monitoring the signals detected by the antenna to detect an error condition associated with the vehicle antenna.

14. A method as described in claim 13, wherein an error condition associated with the vehicle antenna is detected when a time period since the last signal conveying data detected by the antenna exceeds a certain threshold time period.

15. A method for testing a vehicle antenna, the vehicle antenna generating an electromagnetic field, said method comprising:

a) providing a testing transponder responsive to an electromagnetic field of a vehicle antenna for intermittently transmitting signals conveying data in a format suitable to be detected by the vehicle antenna;

b) positioning the testing transponder in the electromagnetic field of a vehicle antenna;

c) monitoring the signals detected by the antenna to detect an error condition associated with the vehicle antenna when a time period since the last signal conveying data detected by the antenna exceeds a certain threshold time period.

16. A method as described in claim 15, wherein the testing transponder is positioned in the electromagnetic field of a vehicle antenna such that the strength of the electromagnetic field at the testing transponder is not greater than the strength of the electromagnetic field of the antenna at transponders positioned on a path in proximity of which a vehicle transporting the vehicle antenna is to come.

17. In combination:

a) a testing transponder responsive to an electromagnetic field of an antenna for intermittently transmitting signals conveying data in a format suitable to be detected by the vehicle antenna;

b) a monitoring unit suitable to be operatively coupled to a vehicle antenna, said monitoring unit being operative for monitoring the signals conveying data to detect an error condition associated with the vehicle antenna when a time period since the last signal conveying data detected by the antenna exceeds a certain threshold time period.

18. In combination:

a) a vehicle antenna suitable for generating an electromagnetic field;

b) a testing transponder responsive to the electromagnetic field of the vehicle antenna for intermittently transmitting signals conveying data in a format suitable to be detected by the vehicle antenna;

c) a monitoring unit suitable to be operatively coupled to a vehicle antenna, said monitoring unit being operative for monitoring the signals conveying data to detect an error condition associated with the vehicle antenna when a time period since the last signal conveying data detected by the antenna exceeds a certain threshold time period.

19. An apparatus for testing a vehicle antenna, said apparatus comprising:

a) means responsive to an electromagnetic field of a vehicle antenna for generating a first power signal;

b) means for processing said first power signal to generate an intermittent power signal, said intermittent power signal including power segments;

c) means responsive to the power segments in said intermittent power signal for generating a succession of signals, each signal conveying data to be transmitted to the vehicle antenna.

20. A method of testing a vehicle antenna, said method comprising:

providing an apparatus that is operative for:
generating signals for conveying data in a format suitable to be detected by the vehicle antenna;
intermittently transmitting said signals in response to the presence of an electromagnetic field of a vehicle antenna;

positioning said apparatus within an electromagnetic field of an antenna.

* * * * *

UNITED STATES PATENT AND TRADEMARK OFFICE
CERTIFICATE OF CORRECTION

PATENT NO.    : 6,693,584 B2
DATED         : February 17, 2004
INVENTOR(S)   : Horst et al.

It is certified that error appears in the above-identified patent and that said Letters Patent is hereby corrected as shown below:

Title page,
Item [54], Title, "METHOD AND SYSTEMS FOR TESTING AN ANTENNA" should read -- METHOD AND SYSTEM FOR TESTING AN ANTENNA --

Column 7,
Lines 40-41, "elctromagnetic" should read -- electromagnetic --

Signed and Sealed this

Third Day of August, 2004

JON W. DUDAS
*Acting Director of the United States Patent and Trademark Office*